(12) United States Patent
Iwai

(10) Patent No.: US 11,387,760 B2
(45) Date of Patent: Jul. 12, 2022

(54) MOTOR CONTROL DEVICE

(71) Applicant: JTEKT CORPORATION, Osaka (JP)

(72) Inventor: Yuta Iwai, Nara (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 17/339,435

(22) Filed: Jun. 4, 2021

(65) Prior Publication Data
US 2021/0384857 A1 Dec. 9, 2021

(30) Foreign Application Priority Data

Jun. 8, 2020 (JP) .............................. JP2020-099541

(51) Int. Cl.
*H02P 1/46* (2006.01)
*H02P 3/18* (2006.01)
(Continued)

(52) U.S. Cl.
CPC ............ *H02P 21/22* (2016.02); *H02P 21/001* (2013.01); *H02P 21/18* (2016.02); *H02P 25/08* (2013.01); *H02P 27/12* (2013.01); *B62D 5/0463* (2013.01)

(58) Field of Classification Search
CPC ........ H02P 21/22; H02P 21/18; H02P 21/001; H02P 25/08; H02P 27/12
(Continued)

(56) References Cited

U.S. PATENT DOCUMENTS

| 2011/0221365 A1* | 9/2011 | Gallegos-Lopez | ..... H02P 25/22 |
| | | | 318/400.02 |
| 2012/0217915 A1* | 8/2012 | Wu | ......... H02P 21/36 |
| | | | 318/400.07 |

(Continued)

FOREIGN PATENT DOCUMENTS

| JP | 2009-137323 A | 6/2009 |
| JP | 2019-047568 A | 3/2019 |

(Continued)

OTHER PUBLICATIONS

Shinohara et al., "Asymptotic MTPF Control for High-Speed Operations in Direct Torque Controlled IPMSM Drives," IEEE 12th International Conference on power Electronic and Drive Systems, Dec. 12-15, 2017, Honolulu, USA, pp. 816-821.

(Continued)

*Primary Examiner* — Erick D Glass
(74) *Attorney, Agent, or Firm* — Oliff PLC

(57) ABSTRACT

A motor control device includes: a second setting unit configured to set an armature current command value and a current phase angle command value based on a rotation speed and a motor torque command value; and a current vector setting unit configured to set a d-axis current command value and a q-axis current command value based on the armature current command value and the current phase angle command value. The second setting unit is configured to set the armature current command value and the current phase angle command value such that an armature current vector which is set based on the d-axis current command value and the q-axis current command value is included in an area surrounded by an armature current vector locus in maximum torque/current control and a vertical axis in a d-q coordinate system.

5 Claims, 10 Drawing Sheets

(51) Int. Cl.
*H02P 6/00* (2016.01)
*H02P 21/22* (2016.01)
*H02P 21/18* (2016.01)
*H02P 21/00* (2016.01)
*H02P 25/08* (2016.01)
*H02P 27/12* (2006.01)
*B62D 5/04* (2006.01)

(58) Field of Classification Search
USPC .......................................................... 318/701
See application file for complete search history.

(56) References Cited

U.S. PATENT DOCUMENTS

| | | | |
|---|---|---|---|
| 2012/0221280 A1* | 8/2012 | Wu ......................... | H02P 21/22 |
| | | | 702/113 |
| 2015/0185095 A1* | 7/2015 | Wu ......................... | H02P 21/20 |
| | | | 73/862.08 |
| 2020/0366230 A1 | 11/2020 | Iwai | |

FOREIGN PATENT DOCUMENTS

| | | |
|---|---|---|
| WO | 2019/017231 A1 | 1/2019 |
| WO | 2020/003771 A1 | 1/2020 |

OTHER PUBLICATIONS

Zeng et al., "Novel Approach for Operation Analysis of Vector Controlled Adjustable Speed Synchronous Machine Drives," Power Electronics and Motion Control Conference, 2000, pp. 792-797.
Oct. 18, 2021 Extended Search Report issued in European Patent Application No. 21177741.2.
Hasegawa et al., "Drive Circuit Technique and Drive Control Technique of Reluctance Motor of Permanent Magnet Motor-6. Reluctance Motor Control Technique-," The Institute of Electrical Engineers of Japan, Industrial Application Group Conference, Papers, 2004, pp. I-119-I-124.

* cited by examiner

FIG. 7A

| | ω | 1 | 2 | ⋯ | M |
|---|---|---|---|---|---|
| 1 | $\omega_1$ | $T_{s11}$ | $T_{s12}$ | ⋯ | $T_{s1M}$ |
| 2 | $\omega_2$ | $T_{s21}$ | $T_{s22}$ | ⋯ | $T_{s2M}$ |
| ⋮ | ⋮ | ⋮ | ⋮ | ⋱ | ⋮ |
| N | $\omega_N$ | $T_{sN1}$ | $T_{sN2}$ | ⋯ | $T_{sNM}$ |

FIG. 7B

| | ω | 1 | 2 | ⋯ | M |
|---|---|---|---|---|---|
| 1 | $\omega_1$ | $I_{a11}$ | $I_{a12}$ | ⋯ | $I_{a1M}$ |
| 2 | $\omega_2$ | $I_{a21}$ | $I_{a22}$ | ⋯ | $I_{a2M}$ |
| ⋮ | ⋮ | ⋮ | ⋮ | ⋱ | ⋮ |
| N | $\omega_N$ | $I_{aN1}$ | $I_{aN2}$ | ⋯ | $I_{aNM}$ |

FIG. 7C

| | ω | 1 | 2 | ⋯ | M |
|---|---|---|---|---|---|
| 1 | $\omega_1$ | $\beta_{11}$ | $\beta_{12}$ | ⋯ | $\beta_{1M}$ |
| 2 | $\omega_2$ | $\beta_{21}$ | $\beta_{22}$ | ⋯ | $\beta_{2M}$ |
| ⋮ | ⋮ | ⋮ | ⋮ | ⋱ | ⋮ |
| N | $\omega_N$ | $\beta_{N1}$ | $\beta_{N2}$ | ⋯ | $\beta_{NM}$ |

MOTOR CONTROL DEVICE

CROSS-REFERENCE TO RELATED APPLICATION

This application claims priority to Japanese Patent Application No. 2020-099541 filed on Jun. 8, 2020, incorporated herein by reference in its entirety.

BACKGROUND

1. Technical Field

The disclosure relates to a motor control device that controls a motor in which a rotor is rotated using a reluctance torque (hereinafter also referred to as a "motor using a reluctance torque"). Examples of a motor using a reluctance torque include a motor in which a rotor is rotated using a reluctance torque and a magnet torque in addition to a reluctance motor in which a rotor is rotated using only the reluctance torque.

2. Description of Related Art

A reluctance motor that rotates a rotor using only a reluctance torque is known. Examples of a reluctance motor include a switched reluctance motor (SRM) including a stator and a rotor with protruding pole portions and a synchronous reluctance motor (SynRM) with a stator having the same structure as a brushless motor.

Out of the stator and the rotor of the synchronous reluctance motor, only the rotor includes protruding pole portions. In the synchronous reluctance motor, there are a direction of a protruding pole portion in which magnetic flux flows easily (hereinafter referred to as a "d-axis direction") and a direction of a non-protruding pole portion in which magnetic flux does not flow easily (hereinafter referred to as a "q-axis direction") due to the protruding pole portions of the rotor. Accordingly, a reluctance torque is generated due to a difference ($L_d$-$L_q$) between an inductance in the d-axis direction (hereinafter referred to as a "d-axis inductance $L_d$") and an inductance in the q-axis direction (hereinafter referred to as a "q-axis inductance $L_q$") and the rotor is rotated by the reluctance torque.

WO 2019-017231 discloses a control method of controlling a synchronous reluctance motor in which maximum torque/current control using a maximum torque table and maximum output/speed control using a high output table are switched based on a rotation speed. In the maximum torque table, a motor torque which is generated from a motor is stored for a combination of an armature current command value and a current phase angle command value in which the motor torque is maximized at the armature current command value for each armature current command value. In the high output table, a combination of an armature current command value and a current phase angle command value in which the motor torque is maximized is stored for each rotation speed of the motor.

When the rotation speed of the motor is in a low rotation speed area which is equal to or lower than a predetermined rotation speed (for example, in a constant torque area), the maximum torque/current control is performed. Specifically, an armature current command value and a current phase angle command value are calculated based on the maximum torque table such that a motor torque corresponding to a motor torque command value is generated from the motor, and the motor is controlled based on the calculated armature current command value and the calculated current phase angle command value.

On the other hand, when the rotation speed of the motor is in a high rotation speed area which is higher than the predetermined rotation speed (for example, in a constant output area), the maximum output/speed control is performed. Specifically, an armature current command value and a current phase angle command value with which the motor torque is maximized at a current rotation speed are calculated based on the high output table, and the motor is controlled based on the calculated armature current command value and the calculated current phase angle command value.

SUMMARY

In the control method described in WO 2019/017231, a maximum torque can be output but a motor torque corresponding to a motor torque command value cannot be output in the high rotation speed area in which the maximum output/speed control is performed. The disclosure provides a motor control device that can output a maximum torque and output a motor torque corresponding to a motor torque command value in all rotation speed areas.

According to an aspect of the disclosure, there is provided a motor control device that controls a motor using a reluctance torque. The motor control device includes: a first setting unit configured to set a motor torque command value which is a command value of a motor torque which is to be generated from the motor; a rotation speed detecting unit configured to detect a rotation speed of the motor; a second setting unit configured to set an armature current command value and a current phase angle command value based on the rotation speed and the motor torque command value; a current vector setting unit configured to set a d-axis current command value and a q-axis current command value based on the armature current command value and the current phase angle command value; and a drive unit configured to drive the motor based on the d-axis current command value and the q-axis current command value. The second setting unit is configured to set the armature current command value and the current phase angle command value such that an armature current vector which is set based on the d-axis current command value and the q-axis current command value is included in an area surrounded by an armature current vector locus in maximum torque/current control and a vertical axis in a d-q coordinate system with a d-axis current on a horizontal axis and with a q-axis current on the vertical axis.

According to this aspect, it is possible to output a maximum torque and to output a motor torque corresponding to a motor torque command value in all rotation speed areas. The motor control device according to the aspect may further include: a first table in which a motor torque generated from the motor is stored in correlation with a combination of an armature current command value and a current phase angle command value in which the motor torque is maximized at the corresponding armature current command value; and a second table in which armature current command values, current phase angle command values, and motor torques at a plurality of operating points on a voltage limiting oval are stored in correlation for each rotation speed of the motor. The second setting unit may be configured to calculate an armature current command value and a current phase angle command value of a first candidate based on the motor torque command value and the first table, to calculate an armature current command value and a current phase angle command value of a second candidate based on the rotation speed, the motor torque command value, and the second table, to set the armature current command value and the current phase angle command value of the first candidate as command values when the current phase angle command value of the first candidate is equal to or greater than the current phase angle command value of the second candidate, and to set the armature current command value and the current phase angle command value of the second candidate as command values when the current phase angle command value of the first candidate is less than the current phase angle command value of the second candidate.

In this configuration, the plurality of operating points on the voltage limiting oval corresponding to a rotation speed of the motor may include an operating point at which the motor torque is maximized at the rotation speed. The motor control device according to the aspect may further include: a first table in which a motor torque generated from the motor is stored in correlation with a combination of an armature current command value and a current phase angle command value in which the motor torque is maximized at the corresponding armature current command value; and a third table in which armature current command values, current phase angle command values, and motor torques at a plurality of third operating points including a first operating point at which the motor torque is maximized at a corresponding rotation speed and a plurality of second operating points which is set in a direction in which an operating point moves from the first operating point when an inter-terminal voltage of the motor decreases are stored in correlation for each rotation speed of the motor. The second setting unit may be configured to set the armature current command value and the current phase angle command value based on the motor torque command value and the first table when the rotation speed is equal to or lower than a predetermined value and to set the armature current command value and the current phase angle command value based on the rotation speed, the motor torque command value, and the third table when the rotation speed is higher than the predetermined value.

In this configuration, the plurality of third operating points may be set on a straight line connecting the first operating point at the corresponding rotation speed and a convergent point which is set as an origin of the d-q coordinate system or a predetermined point close to the origin for each rotation speed in the d-q coordinate system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7A is a diagram schematically illustrating an example of details of a torque command value table;

FIG. 7B is a diagram schematically illustrating an example of details of a torque command value table;

FIG. 7C is a diagram schematically illustrating an example of details of a current phase angle command value table;

DETAILED DESCRIPTION OF EMBODIMENTS

Hereinafter, embodiments of the disclosure will be described in detail with reference to the accompanying drawings.

[1] First Embodiment

Figure 1:
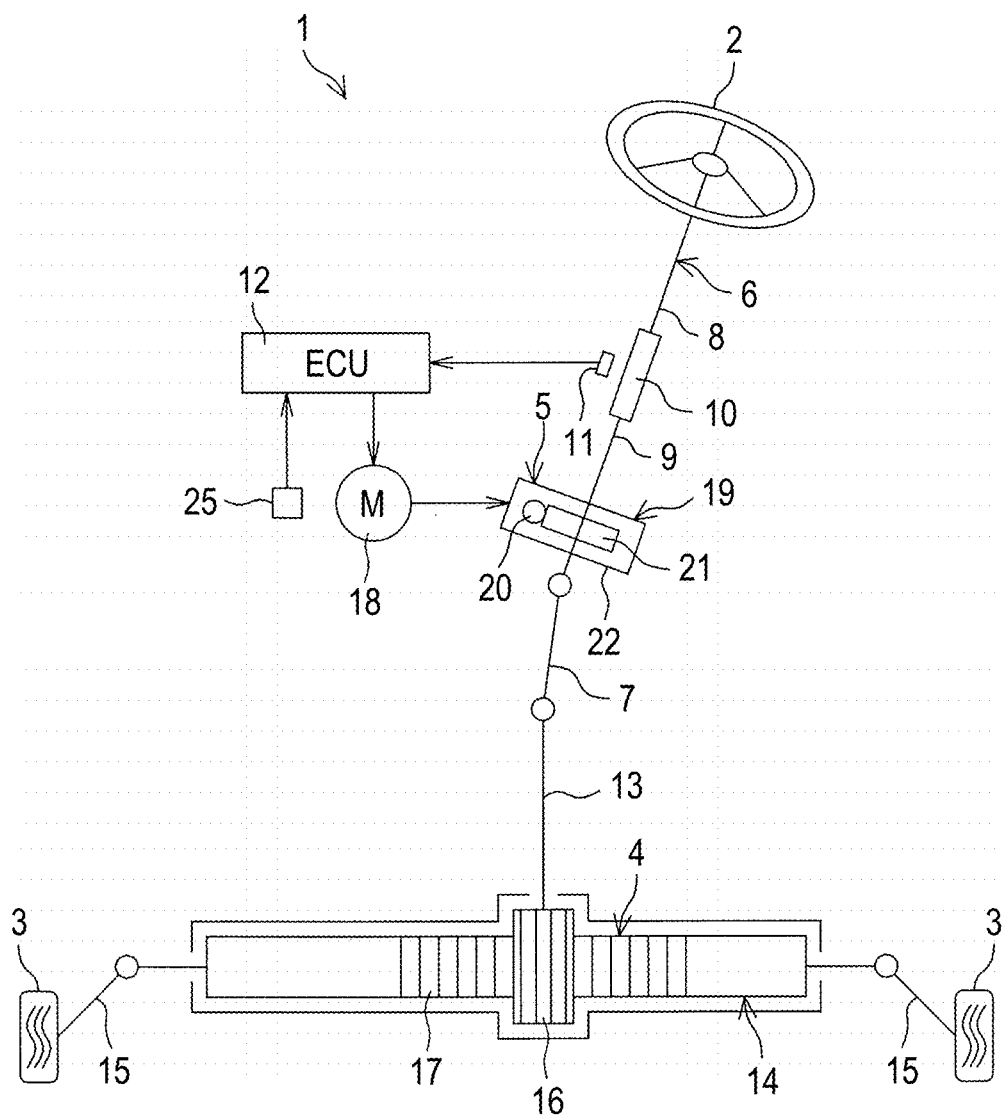
FIG. 1 is a diagram schematically illustrating a configuration of an electric power steering device to which a motor control device according to an embodiment of the disclosure is applied.

FIG. 1 is a diagram schematically illustrating a configuration of an electric power steering device to which a motor control device according to a first embodiment of the disclosure is applied. The electric power steering device 1 includes a steering wheel 2 that is a steering member for steering a vehicle, a turning mechanism 4 that turns turning wheels 3 with rotation of the steering wheel 2, and a steering assist mechanism 5 that assists with a driver's steering. The steering wheel 2 and the turning mechanism 4 are mechanically connected to each other via a steering shaft 6 and an intermediate shaft 7.

The steering shaft 6 includes an input shaft 8 that is connected to the steering wheel 2 and an output shaft 9 that is connected to the intermediate shaft 7. The input shaft 8 and the output shaft 9 are connected via a torsion bar 10 such that they can rotate relative to each other. A torque sensor 11 is provided around the steering shaft 6. The torque sensor 11 detects a steering torque $T_h$ which is applied to the steering wheel 2 based on a relative rotational displacement between the input shaft 8 and the output shaft 9. The steering torque $T_h$ which is detected by the torque sensor 11 is input to an electronic control unit (ECU) 12.

The turning mechanism 4 is constituted by a rack and pinion mechanism including a pinion shaft 13 and a rack shaft 14 which is a turning shaft. The turning wheels 3 are connected to ends of the rack shaft 14 via tie rods 15 and knuckle arms (not illustrated). The pinion shaft 13 is connected to the intermediate shaft 7. A pinion 16 is connected to a tip of the pinion shaft 13. The rack shaft 14 extends in a straight line shape in a lateral direction of the vehicle. A rack 17 that engages with the pinion 16 is formed in the middle in an axial direction of the rack shaft 14. Rotation of the pinion shaft 13 is converted to movement in an axial direction of the rack shaft 14 by the pinion 16 and the rack 17. By moving the rack shaft 14 in the axial direction, the turning wheels 3 can be turned.

When the steering wheel 2 is steered (rotated), this rotation is transmitted to the pinion shaft 13 via the steering shaft 6 and the intermediate shaft 7. The rotation of the pinion shaft 13 is converted into movement in the axial direction of the rack shaft 14 by the pinion 16 and the rack 17. Accordingly, the turning wheels 3 are turned. The steering assist mechanism 5 includes an electric motor 18 for assisting with steering and a reduction gear 19 that transmits an output torque of the electric motor 18 to the turning mechanism 4. In this embodiment, the electric motor 18 is constituted by a synchronous reluctance motor. The reduction gear 19 is constituted by a worm gear mechanism including a worm gear 20 and a worm wheel 21 that engages with the worm gear 20. The reduction gear 19 is accommodated in a gear housing 22.

The worm gear 20 is rotationally driven by the electric motor 18. The worm wheel 21 is connected to the steering shaft 6 such that they can rotate integrally. The worm wheel 21 is rotationally driven by the worm gear 20. When the worm gear 20 is rotationally driven by the electric motor 18, the worm wheel 21 is rotationally driven and the steering shaft 6 rotates. The rotation of the steering shaft 6 is transmitted to the pinion shaft 13 via the intermediate shaft 7. The rotation of the pinion shaft 13 is converted into movement in the axial direction of the rack shaft 14 by the rack and pinion mechanism. Accordingly, the turning wheels 3 are turned. That is, by rotationally driving worm gear 20 using the electric motor 18, steering assist using the electric motor 18 becomes possible.

Figure 2:
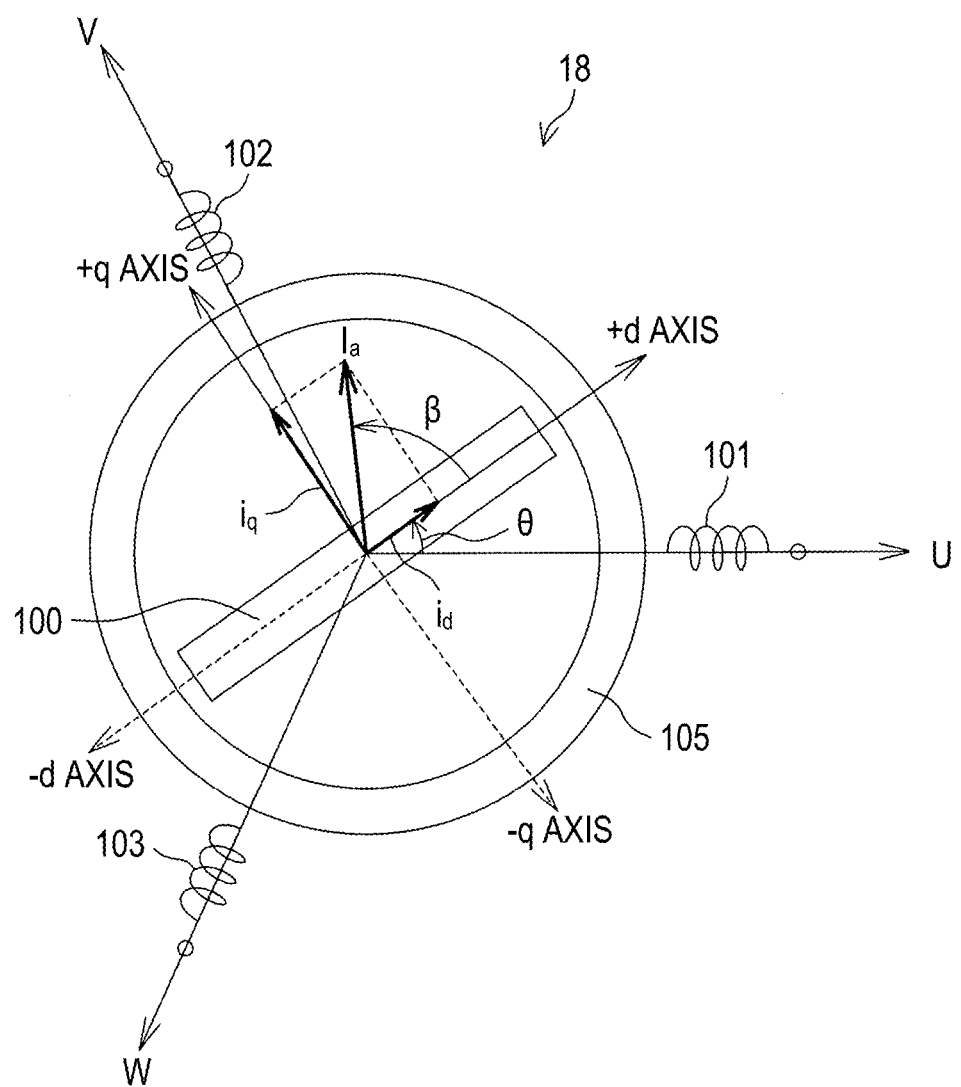
FIG. 2 is a diagram schematically illustrating a configuration of an electric motor.

A rotation angle of a rotor (hereinafter referred to as a "rotor rotation angle") of the electric motor 18 is detected by a rotation angle sensor 25 such as a resolver. An output signal of the rotation angle sensor 25 is input to the ECU 12. The electric motor 18 is controlled by the ECU 12 which is a motor control device. FIG. 2 is a diagram schematically illustrating a configuration of the electric motor 18.

The electric motor 18 is a synchronous reluctance motor as described above and includes a rotor 100 including a plurality of protruding pole portions which are arranged at intervals in a circumferential direction and a stator 105 including an armature winding as schematically illustrated in FIG. 2. The armature winding has a configuration in which a U-phase stator coil 101, a V-phase stator coil 102, and a W-phase stator coil 103 are star-connected.

A three-phase fixed coordinate system (a UVW coordinate system) with a U axis, a V axis, and a W axis set to the directions of the phase stator coils 101, 102, and 103 is defined. A two-phase rotary coordinate system (a d-q coordinate system, an actual rotary coordinate system) in which a d-axis direction is a direction of a protruding pole portion in which magnetic flux flows easily from the rotation center of the rotor 100 to an outer circumferential portion and a q-axis direction is a direction of a non-protruding pole portion in which magnetic flux does not flow easily from the rotation center of the rotor 100 to the outer circumferential portion is defined. The d-q coordinate system is an actual rotary coordinate system corresponding to a rotation angle (rotor rotation angle) θ of the rotor 100.

In this embodiment, the rotor rotation angle (electrical angle) θ is defined as a rotation angle in the counterclockwise direction from the U axis to one protruding pole portion (the d axis) serving as a reference out of two neighboring protruding pole portions (d axis). The direction of the one protruding pole portion serving as a reference is defined as a +d-axis direction and the direction of the other protruding pole portion adjacent thereto is defined as a −d-axis direction. An axis rotating by an electrical angle of +90 degrees from the +d axis is defined as a +q axis, and an axis rotating by an electrical angle of −90 degrees from the +d axis is defined as a −q axis. Magnetic poles (an N pole and an S pole) caused in the rotor 100 (the protruding pole portions) are determined by a direction of a current vector $I_a$ in the d-q coordinate system. In this embodiment, the forward rotation direction of the electric motor 18 corresponds to the counterclockwise direction (CCW) of the rotor 100 in FIG. 2, and the reverse rotation direction of the electric motor 18 corresponds to the clockwise direction (CW) of the rotor 100 in FIG. 2.

Coordinate conversion between the UVW coordinate system and the d-q coordinate system is performed using the rotor rotation angle θ (for example, see Expressions (1) and (2) in Japanese Unexamined Patent Application Publication No. 2009-137323 (JP 2009-137323 A)). In this specification, a current flowing in an armature winding is referred to as an "armature current" or a "motor current." A current vector $I_a$ in the d-q coordinate system is a vector of a current (an armature current vector) flowing in the armature winding. β represents a current phase angle and is a phase difference between the armature current vector $I_a$ and the d axis. $i_d$ represents a d-axis current and is expressed by $i_d = I_a \cdot \cos\beta$. $i_q$ represents a q-axis current and is expressed by $i_q = I_a \cdot \sin\beta$.

Figure 3:
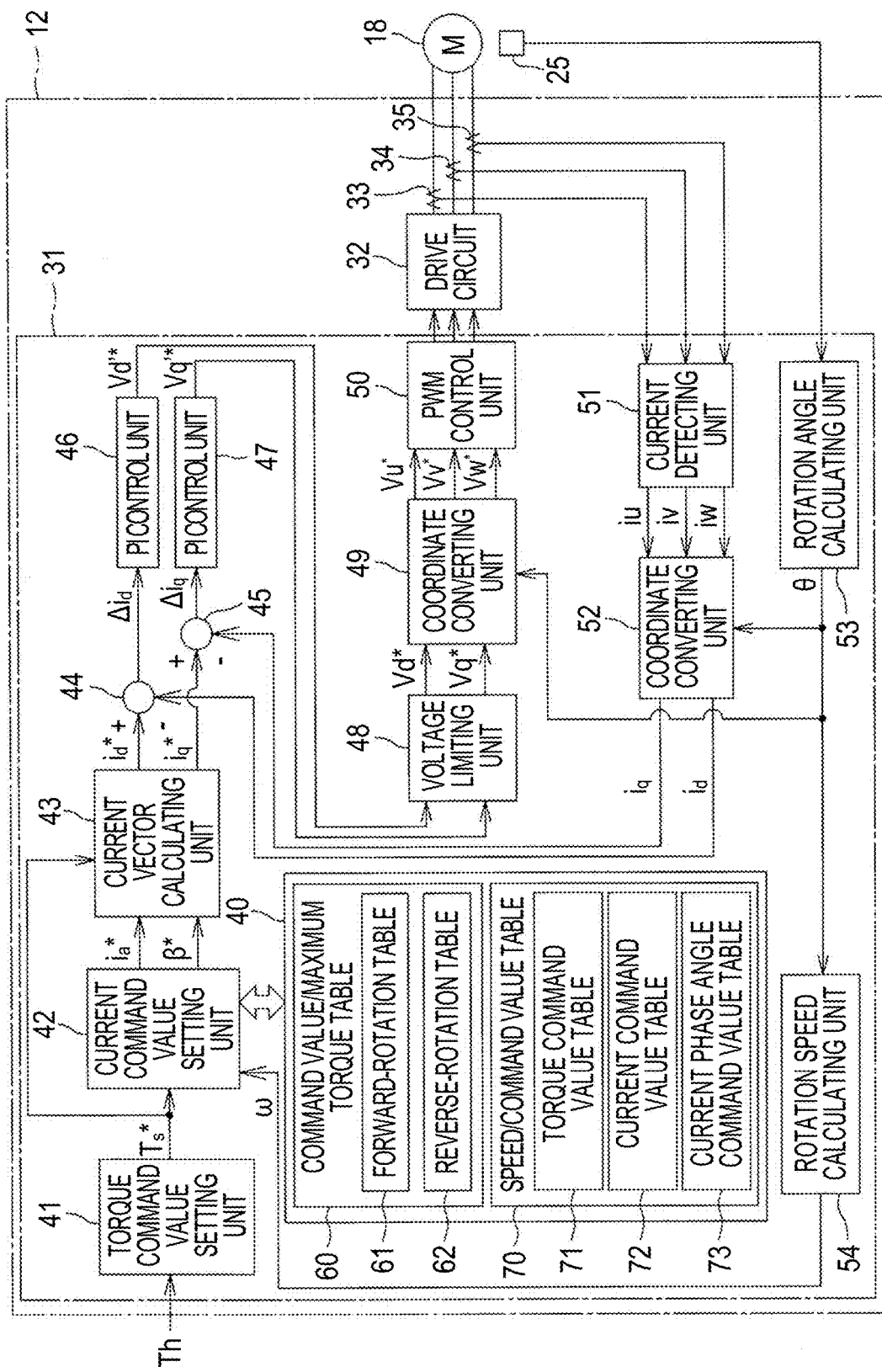
FIG. 3 is a diagram schematically illustrating an electrical configuration of an ECU illustrated in FIG. 1.

FIG. 3 is a diagram schematically illustrating an electrical configuration of the ECU 12 illustrated in FIG. 1. The ECU 12 includes a microcomputer 31, a drive circuit (inverter circuit) 32 that is controlled by the microcomputer 31 and supplies electric power to the electric motor 18, and current sensors 33, 34, and 35 that detect a U-phase current, a V-phase current, and a W-phase current flowing in the electric motor 18.

The microcomputer 31 includes a CPU and a memory and serves as a plurality of function processing units by executing a predetermined program. The memory includes a ROM, a RAM, and a nonvolatile memory 40. The plurality of function processing units includes a torque command value setting unit 41, a current command value setting unit 42, a current vector calculating unit (current vector setting unit) 43, a d-axis current difference calculating unit 44, a q-axis current difference calculating unit 45, a d-axis proportional integral (PI) control unit 46, a q-axis proportional integral (PI) control unit 47, a voltage limiting unit 48, a two-phase/three-phase coordinate converting unit 49, a PWM control unit 50, a current detecting unit 51, a three-phase/two-phase coordinate converting unit 52, a rotation angle calculating unit 53, and a rotation speed calculating unit 54.

The rotation angle calculating unit 53 calculates a rotation angle of the rotor (a rotor rotation angle θ) of the electric motor 18 based on the output signal of the rotation angle sensor 25. The rotor rotation angle θ calculated by the rotation angle calculating unit 53 is given to the rotation speed calculating unit 54 and the coordinate converting units 49 and 52. The rotation speed calculating unit 54 calculates a rotation speed ω [rpm] of the electric motor 18 by integrating the rotor rotation angle θ calculated by the rotation angle calculating unit 53 with respect to time.

Figure 4:
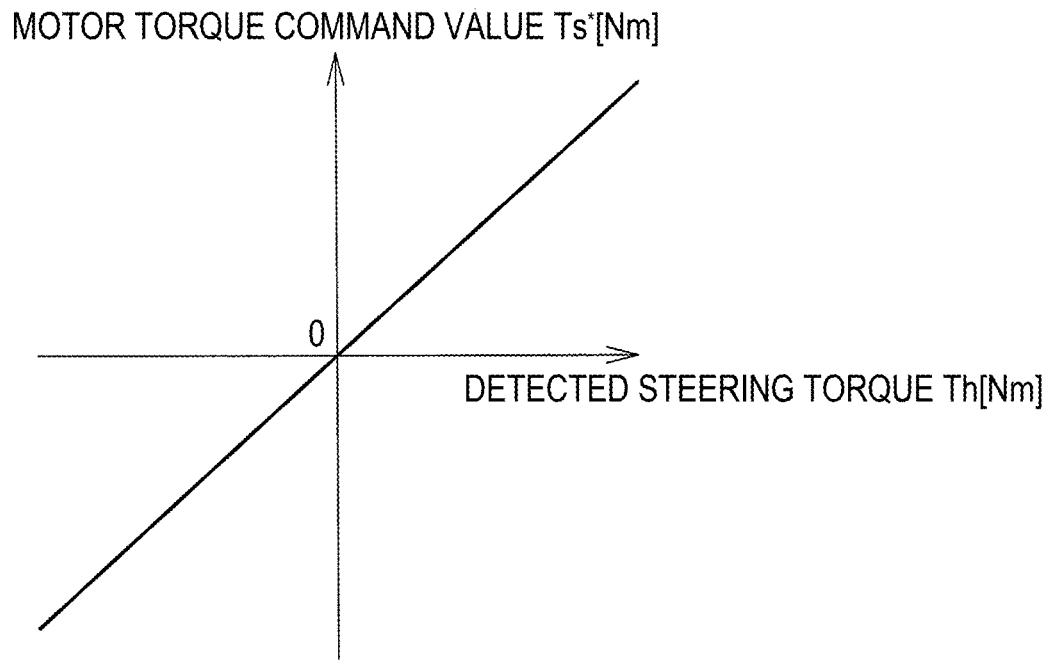
FIG. 4 is a graph illustrating an example in which a motor torque command value $T_s^*$ is set with respect to a detected steering torque $T_h$.

The current detecting unit 51 detects phase currents $i_U$, $i_V$, and $i_W$ of the U phase, the V phase, and the W phase (hereinafter collectively referred to as "detected three-phase currents $i_U$, $i_V$, and $i_W$") based on the output signals of the current sensors 33, 34, and 35. The torque command value setting unit 41 sets a motor torque command value (hereinafter referred to as a "torque command value $T_s^*$") which is a command value of a motor torque which is to be generated from the electric motor 18. Specifically, the torque command value setting unit 41 sets the torque command value $T_s^*$ based on a steering torque detected by the torque sensor 11 (a detected steering torque $T_h$). An example in which the torque command value $T_s^*$ is set with respect to the detected steering torque $T_h$ is illustrated in FIG. 4. Regarding the detected steering torque $T_h$, for example, a torque for left steering is defined as a positive value and a torque for right steering is defined as a negative value. The direction of the motor torque for assisting with left steering of the electric motor 18 is defined as corresponding to the forward rotation direction of the electric motor 18 and the direction of the motor torque for assisting with right steering is defined as corresponding to the reverse rotation direction of the electric motor 18. The torque command value $T_s^*$ has a positive value when a steering assist force for left steering is to be generated from the electric motor 18, and has a negative value when a steering assist force for right steering is to be generated from the electric motor 18.

The torque command value $T_s^*$ has a positive value when the detected steering torque $T_h$ has a positive value, and has a negative value when the detected steering torque $T_h$ has a negative value. When the detected steering torque $T_h$ is 0, the torque command value $T_s^*$ is 0. As the absolute value of the detected steering torque $T_h$ increases, the absolute value of the torque command value $T_s^*$ increases. Accordingly, as the absolute value of the detected steering torque $T_h$ increases, the steering assist force can increase.

The torque command value setting unit 41 sets the torque command value $T_s^*$ corresponding to the steering torque $T_h$, for example, using a map in which a relationship between the steering torque $T_h$ and the torque command value $T_s^*$ is stored or a calculational expression indicating the relationship as illustrated in FIG. 4. The torque command value $T_s^*$ set by the torque command value setting unit 41 is given to the current command value setting unit 42 and the current vector calculating unit 43.

In the nonvolatile memory 40, a command value/maximum torque table 60 and a speed/command value table 70 are stored. The command value/maximum torque table 60 is an example of a "first table" in the claims, and the speed/command value table 70 in the first embodiment is an example of a "second table" in the claims. Details of these tables 60 and 70 will be described later. The current command value setting unit 42 sets an armature current command value $I_a^*$ ($I_a^* > 0$) and a current phase angle command value $\beta^*$ ($\beta^* > 0$) based on the torque command value $T_s^*$, the rotor rotation speed co, and the command value/maximum torque table 60 or the speed/command value table 70. Details of the current command value setting unit 42 will be described later.

The current vector calculating unit 43 calculates a d-axis current command value $i_d^*$ and a q-axis current command value $i_q^*$ based on the armature current command value $I_a^*$ and the current phase angle command value $\beta^*$ set by the current command value setting unit 42 and the sign of the torque command value $T_s^*$. Specifically, the current vector calculating unit 43 calculates the d-axis current command value id* using Expression (1).

$$i_d^* = I_a^* \cdot \cos \beta^* \quad (1)$$

The current vector calculating unit 43 calculates the q-axis current command value $i_q^*$ using Expression (2a) or (2b).

$$i_q^* = I_a^* \cdot \sin \beta^* \text{ if } T_s^* > 0 \quad (2a)$$

$$i_q^* = I_a^* \cdot \sin(-\beta^*) \text{ if } T_s^* < 0 \quad (2b)$$

The d-axis current command value $i_d^*$ and the q-axis current command value $i_q^*$ may be collectively referred to as "two-phase instruction currents $i_d^*$ and $i_q^*$." The three-phase currents $i_U$, $i_V$, and $i_W$ detected by the current detecting unit 51 are given to the three-phase/two-phase coordinate converting unit 52. The three-phase/two-phase coordinate converting unit 52 converts the detected three-phase currents $i_U$, $i_V$, and $i_W$ to a d-axis current $i_d$ and a q-axis current $i_q$ (hereinafter collectively referred to as "detected two-phase currents $i_d$ and $i_q$") in the d-q coordinate system using the rotor rotation angle θ calculated by the rotation angle calculating unit 53. The d-axis current $i_d$ acquired by the three-phase/two-phase coordinate converting unit 52 is given to the d-axis current difference calculating unit 44. The q-axis current $i_q$ acquired by the three-phase/two-phase coordinate converting unit 52 is given to the q-axis current difference calculating unit 45.

The d-axis current difference calculating unit 44 calculates a difference $\Delta id$ ($=i_d^* - i_d$) between the d-axis current $i_d$ and the d-axis current command value $i_d^*$. The d-axis PI control unit 46 calculates a d-axis instruction voltage $v_d'^*$ by performing a proportional integral (PI) on the current difference $\Delta i_d$ calculated by the d-axis current difference calculating unit 44. The d-axis instruction voltage $v_d'^*$ is given to the voltage limiting unit 48. The q-axis current difference calculating unit 45 calculates a difference $\Delta iq$ ($=i_q^* - i_q$) between the q-axis current $i_q$ and the q-axis current command value $i_q^*$. The q-axis PI control unit 47 calculates a q-axis instruction voltage $v_q'^*$ by performing a proportional integral (PI) on the current difference $\Delta i_q$ calculated by the q-axis current difference calculating unit 45. The q-axis instruction voltage $v_q'^*$ is given to the voltage limiting unit 48.

The voltage limiting unit 48 is provided to avoid a state in which an induced voltage in the electric motor 18 is higher than a source voltage and a current cannot flow in the electric motor 18 (a voltage saturated state). For example, the voltage limiting unit 48 limits the d-axis instruction voltage $v_d'^*$ to equal to or less than a preset maximum d-axis voltage command value and limits the q-axis instruction voltage $v_q'^*$ to equal to or less than a preset maximum q-axis voltage command value. The d-axis instruction voltage $v_d^*$ and the q-axis instruction voltage $v_q^*$ subjected to the limiting process by the voltage limiting unit 48 are given to the two-phase/three-phase coordinate converting unit 49.

The two-phase/three-phase coordinate converting unit 49 converts the d-axis instruction voltage $v_d^*$ and the q-axis instruction voltage $v_q^*$ to instruction voltages $v_U^*$, $v_V^*$, and $v_W^*$ of the U, V, and W phases using the rotor rotation angle θ calculated by the rotation angle calculating unit 53. The instruction voltages $v_U^*$, $v_V^*$, and $v_W^*$ of the U, V, and W phases are collectively referred to as "three-phase instruction voltages $v_U^*$, $v_V^*$, and $v_W^*$." The PWM control unit 50 generates a U-phase PWM control signal, a V-phase PWM control signal, and a W-phase PWM control signal with duty ratios corresponding to the U-phase instruction voltage $v_U^*$, the V-phase instruction voltage $v_V^*$, and the W-phase instruction voltage $v_W^*$ and supplies the generated PWM control signals to the drive circuit 32.

The drive circuit 32 includes three-phase inverter circuits corresponding to the U, V, and W phases. Power elements constituting the inverter circuits are controlled by the PWM control signal given from the PWM control unit 50 such that voltages corresponding to the three-phase instruction voltages $v_U^*$, $v_V^*$, and $v_W^*$ are applied to the phase stator coils of the electric motor 18. The current difference calculating units 44 and 45 and the PI control units 46 and 47 constitute a current feedback control unit. The motor current (the armature current) flowing in the electric motor 18 is controlled by the function of the current feedback control unit such that it reaches the two-phase instruction currents $i_d^*$ and $i_q^*$ calculated by the current vector calculating unit 43.

The command value/maximum torque table 60, the speed/command value table 70, and the current command value setting unit 42 will be described below in detail. First, the command value/maximum torque table 60 will be described. The command value/maximum torque table 60 includes a forward-rotation (CCW) armature current/current phase angle setting table (hereinafter referred to as a "forward-rotation table 61") and a reverse-rotation (CW) armature current/current phase angle setting table (hereinafter referred to as a "reverse-rotation table 62").

In order to efficiently drive the electric motor 18, the electric motor 18 has only to be controlled such that a ratio of the motor torque to the armature current increases. The motor torque $T_s$ in a synchronous reluctance motor with the number of poles $P_n$ is expressed by Expression (3).

$$T_s = P_n \cdot (L_d - L_q) \cdot i_d \cdot i_q \tag{3}$$

$L_d$ is a d-axis inductance [H] and $L_q$ is a q-axis inductance [H]. $i_d$ is a d-axis current [A] and $i_q$ is a q-axis current [A].

When the magnitude of the armature current is defined as $I_a$ and the current phase angle is defined as $\beta$, $i_q = I_a \cdot \sin \beta$ and $i_d = I_a \cdot \cos \beta$ are satisfied and thus the motor torque $T_s$ is expressed by Expression (4). The current phase angle $\beta$ represents a phase difference between the armature current vector and the d axis.

$$T_s = (1/2) \cdot P_n \cdot (L_d - L_q) \cdot I_a^2 \sin 2\beta \tag{4}$$

Accordingly, when the d-axis inductance $L_d$ and the q-axis inductance $L_q$ do not change, the motor torque $T_s$ is maximized when the current phase angle $\beta$ is 45 degrees. However, in the synchronous reluctance motor, since the d-axis inductance $L_d$ and the q-axis inductance $L_q$ are changed due to magnetic saturation of the rotor core and the stator core, the motor torque $T_s$ may not be maximized when the current phase angle is 45 degrees.

Figure 5:
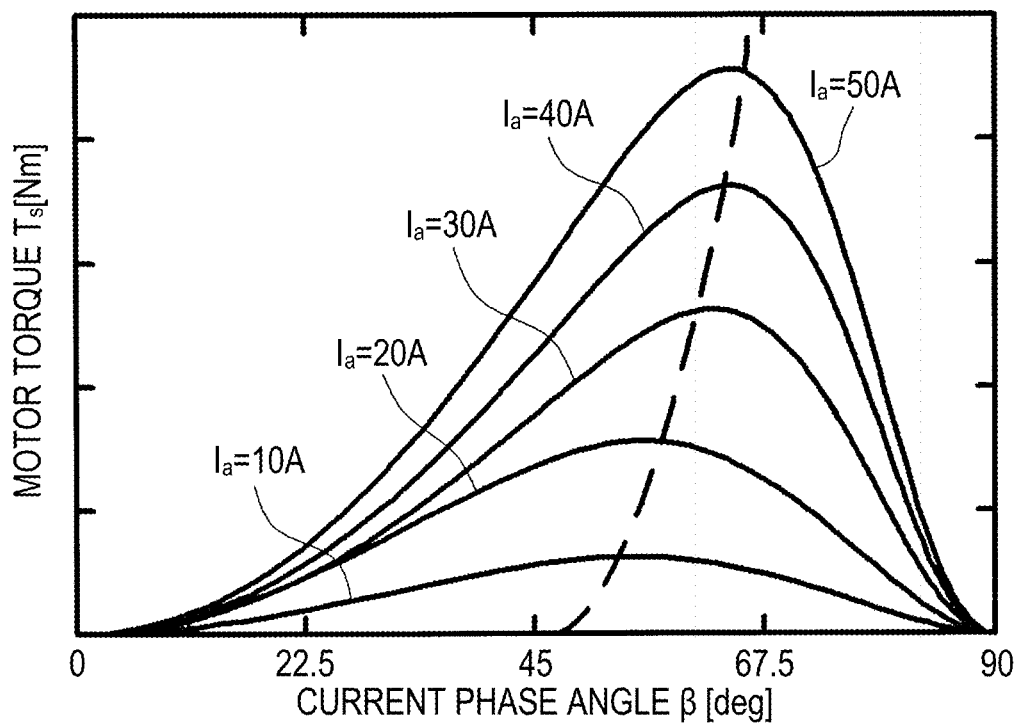
FIG. 5 is a graph illustrating an example of characteristic data of a motor torque T with respect to a current phase angle β which is acquired for each of a plurality of armature currents $I_a$.

FIG. 5 is a graph illustrating characteristic data of a motor torque $T_s$ with respect to a current phase angle which is acquired for each of a plurality of armature currents $I_a$ in a certain synchronous reluctance motor. The characteristic data illustrated in FIG. 5 reuses data described in Masaru HASEGAWA (Chubu Univ.), Shinji DOKI (Nagoya Univ.), Akiyoshi SATAKE (Okuma Corporation), Daohong WANG (Gifu Univ.), "Drive Circuit Technique and Drive Control Technique of Reluctance Motor of Permanent Magnet Motor –6. Reluctance Motor Control Technique-," the Institute of Electrical Engineers of Japan, Industrial Application Group Conference, Papers, 1-119 to 1-124 (2004). In FIG. 5, the horizontal axis is set to the current phase angle $\beta$, the vertical axis is set to the motor torque $T_s$, and characteristics of the motor torque $T_s$ with respect to the current phase angle $\beta$ of each armature current $I_a$ are represented by curves.

As illustrated in FIG. 5, the current phase angle $\beta$ at which the motor torque $T_s$ is maximized differs depending on the magnitude of the armature current $I_a$. In the example illustrated in FIG. 5, as the armature current $I_a$ increases, the current phase angle $\beta$ at which the motor torque $T_s$ is maximized increases. In order to efficiently drive the electric motor 18, it is preferable to set the current phase angle at which the motor torque $T_s$ is maximized for the armature current command value $I_a^*$ as the current phase angle $\beta$.

Figure 6:
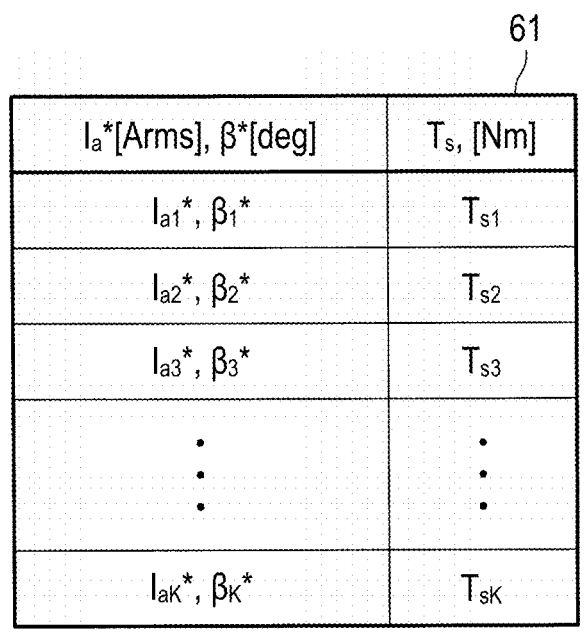
FIG. 6 is a diagram schematically illustrating an example of details of a forward rotation table in a command value/maximum torque table.

FIG. 6 is a schematic diagram illustrating an example of details of the forward-rotation table 61 in the command value/maximum torque table 60. In the forward-rotation table 61, a motor torque $T_s$ [Nm] generated from the electric motor 18 is stored in correlation with a combination of an armature current command value $I_a^*$ when the electric motor 18 rotates in the forward rotation direction and a current phase angle command value $\beta^*$ at which the motor torque $T_s$ is maximized in the armature current command value $I_a^*$ for each armature current command value $I_a^*$.

In this example, data of K armature current command values $I_a^*$ is stored in the forward-rotation table 61. The K armature current command values $I_a^*$ have a relationship of $I_{a1}^* < I_{a2}^* < \ldots < I_{a(K-1)}^* < I_{aK}^*$. The motor torque $T_s$ increases as the armature current command value $I_a^*$ increases. The forward-rotation table 61 is prepared, for example, as follows. When a predetermined armature current command value $I_a^*$, a predetermined current phase angle command value $\beta^*$, and a sign indicating the forward rotation direction are given to the current vector calculating unit 43 of the motor control circuit illustrated in FIG. 3, the electric motor 18 is forward rotationally driven based on two-phase instruction currents $i_d^*$ and $i_q^*$ corresponding to the armature current command value $I_a^*$, the current phase angle command value $\beta^*$, and the sign. In a state in which the electric motor 18 is forward rotationally driven, the motor torque $T_s$ generated from the electric motor 18 (for example, an average value of the motor torque in a predetermined time) is acquired. Accordingly, the motor torque $T_s$ for a combination of the predetermined armature current command value $I_a^*$ and the predetermined current phase angle command value $\beta^*$ is acquired. The motor torque $T_s$ is measured using a measuring instrument which is not illustrated.

By performing this test on each of a plurality of current phase angle command values $\beta^*$, data of the motor torque $T_s$ for each combination of the predetermined armature current command value $I_a^*$ and the plurality of current phase angle command values $\beta^*$ is acquired. The current phase angle command value $\beta^*$ at which the motor torque $T_s$ is maximized for the predetermined armature current command value $I_a^*$ is identified based on the acquired data.

By performing this test on each of a plurality of armature current command values $I_a^*$, data of the motor torque $T_s$ for a combination of an armature current command value $I_a^*$ and a current phase angle command value $\beta^*$ at which the motor torque T is maximized therefor is acquired for each of the plurality of armature current command values $I_a^*$. Accordingly, data for preparing the forward-rotation table 61 is acquired. Although not illustrated, in the reverse-rotation table 62, the motor torque $T_s$ [Nm] generated from the electric motor 18 for a combination of an armature current command value $I_a^*$ when the electric motor 18 rotates in the reverse rotation direction and a current phase angle command value $\beta^*$ at which the motor torque $T_s$ is maximized at the armature current command value $I_a^*$ is stored for each armature current command value $I_a^*$.

The reverse-rotation table 62 is prepared by performing the same test as the test performed to prepare the forward-rotation table 61. When the reverse-rotation table 62 is prepared, unlike when the forward-rotation table 61 is prepared, a sign indicating the reverse rotation direction is given to the current vector calculating unit 43 at the time of test. Accordingly, the electric motor 18 is reversely rotationally driven at the time of test.

A method of acquiring the armature current command value $I_a^*$ and the current phase angle command value $\beta^*$ corresponding to the torque command value $T_s^*$ based on the forward-rotation table 61 or the reverse-rotation table 62, and controlling the electric motor 18 based on the acquired armature current command value $I_a^*$ and the acquired current phase angle command value $\beta^*$ is referred to as "maximum torque/current control." The speed/command value table 70 will be described below. The speed/command value table 70 includes a torque command value table 71, a current command value table 72, and a current phase angle command value table 73 as illustrated in FIG. 3 and FIGS. 7A to 7C.

In the torque command value table 71, a plurality of motor torques $T_{sn1}$ to $T_{snM}$ is stored for each of rotation speeds $\omega_1$ to $\omega_N$ of the electric motor 18 as illustrated in FIG. 7A. N denotes the number of pieces of data of the rotation speed, and M denotes the number of pieces of data of the motor torque $T_s$ which is set for each type of rotation speed. 1 to N in the leftmost column in the torque command value table 71 represent index numbers n of the rotation speed (hereinafter referred to as "speed numbers"). 1 to M in the uppermost row in the torque command value table 71 denote index numbers m of the motor torque (hereinafter referred to as "torque numbers").

In the current command value table 72, a plurality of armature current command values $I_{an1}^*$ to $I_{anM}^*$ corresponding to Torque Numbers 1 to M are stored for each of Speed Numbers 1 to N as illustrated in FIG. 7B. In the current phase angle command value table 73, a plurality of current phase angle command value $\beta_{n1}^*$ to $\beta_{nM}^*$ corresponding to Torque Numbers 1 to M is stored for each of Speed Numbers 1 to N as illustrated in FIG. 7C. Methods of preparing the tables 71 to 73 will be described below with reference to FIG. 8.

Figure 8:
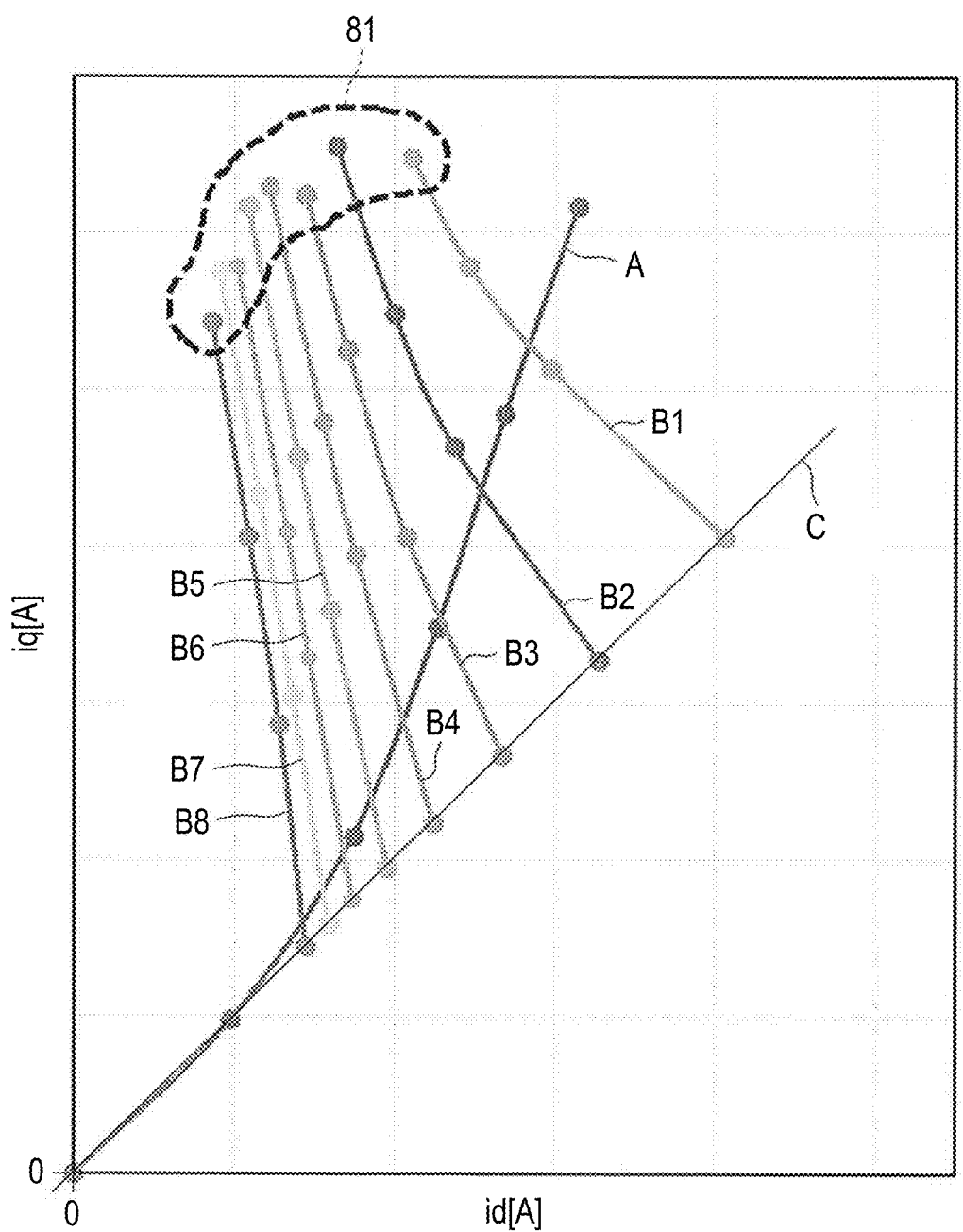
FIG. 8 is a graph illustrating a method of preparing a torque command value table, a current command value table, and a current phase angle command value table.

FIG. 8 illustrates a d-q coordinate system with a d-axis current on the horizontal axis and with a q-axis current on the vertical axis. In FIG. 8, Curve A represents a locus of an armature current vector in maximum torque/current control. Curve A can be prepared, for example, as follows. As illustrated in the command value/maximum torque table 60 of FIG. 6, it is assumed that a current phase angle $\beta$ at which the motor torque is maximized is acquired in advance for each armature current $I_a$.

A d-axis current command value and a q-axis current command value for a current phase angle $\beta$ at which the motor torque is maximized are calculated for each armature current $I_a$ based on $i_d = I_a \cdot \cos \beta$ and $i_q = I_a \cdot \sin \beta$. Then, an end point of an armature current vector (hereinafter referred to as an "operating point") corresponding to the d-axis current command value and the q-axis current command value for the current phase angle $\beta$ at which the motor torque is maximized is plotted on the d-q coordinate system for each armature current $I_a$. A curve passing through the points is drawn to obtain Curve A.

In FIG. 8, Curves B1 to B8 represent loci of the armature current vector when the current phase angle is changed at 8 types of rotation speeds which are different from each other by a predetermined value (200 rpm in this example) within a predetermined range of the rotation speed (a range from 1600 rpm to 3000 rpm in this example). The right end (the lower end) of each curve represents an operating point at which the current phase angle is 45 degrees. The left end (the upper end) of each curve represents an operating point at which the motor torque is maximized.

Curve B1 is a locus of the armature current vector corresponding to 1600 rpm, Curve B8 is a locus of the armature current vector corresponding to 3000 rpm, and the magnitude of the armature current vector when the current phase angle is 45 degrees decreases as the rotation speed increases. Curve C represents a straight line passing through the operating points on Curves B1 to B8 when the current phase angle is 45 degrees. For example, Curve B1 can be drawn as follows.

The electric motor 18 is driven by giving a maximum value of the armature current command value $I_a^*$ and a predetermined current phase angle command value $\beta^*$ to the current vector calculating unit 43 of the motor control circuit illustrated in FIG. 3. Then, a load is adjusted such that the rotation speed reaches a predetermined rotation speed (1600 rpm when Curve B1 is prepared). The motor torque $T_s$ and the armature current $I_a$ are measured for a plurality of current phase angle command values $\beta^*$ while slightly increasing the current phase angle command value $\beta^*$ from 45 degrees. The current phase angle command value $\beta^*$ at which the motor torque is maximized is calculated, and the motor torque $T_s$ and the armature current $I_a$ at that time are measured.

The motor torque $T_s$ is measured using a measuring instrument which is not illustrated. The armature current $I_a$ can be calculated from the d-axis current command value $i_d^*$ and the q-axis current command value $i_q^*$ which are output from the coordinate converting unit 52 in FIG. 3. In this way, in a range of the current phase angle command value $\beta^*$ of from 45 degrees to the current phase angle command value $\beta^*$ at which the motor torque is maximized, the motor torque $T_s$ and the armature current $I_a$ are calculated for M current phase angle command values $\beta^*$ including the current phase angle command values $\beta^*$ and different from each other. By plotting the operating points corresponding to the M current phase angle command values $\beta^*$ on the d-q coordinate system and drawing a curve passing therethrough, Curve B1 is obtained. Other Curves B2 to B8 can be drawn using the same method. In FIG. 8, the operating points plotted into a dotted line 81 in Curves B1 to B8 are operating points at which the motor torque is maximized.

When 1600 rpm is defined as Speed Number 1, M motor torques $T_s$ calculated for the rotation speed of 1600 rpm are stored as motor torques $T_{s11}$ to $T_{s1M}$ in a row corresponding to Speed Number 1 in the torque command value table 71, for example, in the ascending order of the current phase angle command values $\beta^*$. M armature currents $I_a$ calculated for the rotation speed of 1600 rpm are stored as armature current command values $I_{a11}^*$ to $I_{a1M}^*$ in a row corresponding to Speed Number 1 in the current command value table 72, for example, in the ascending order of the current phase angle command values $\beta^*$. M current phase angle command values $\beta^*$ calculated for the rotation speed of 1600 rpm are stored as current phase angle command values $\beta_{11}^*$ to $\beta_{1M}^*$ in a row corresponding to Speed Number 1 in the current phase angle command value table 73, for example, in the ascending order of the current phase angle command values $\beta^*$.

M motor torques $T_{n1}$ to $T_{nM}$, M armature current command values $I_{an1}^*$ to $I_{anM}^*$, and M current phase angle command values $\beta_{n1}^*$ to $\beta_{nM}^*$ for each of other Speed Numbers 2 to N are calculated in the same way and are stored in the torque command value table 71, the current command value table 72, and the current phase angle command value table 73. A method of acquiring an armature current command value $I_a^*$ and a current phase angle command value $\beta^*$ corresponding to a torque command value $T_s^*$ and a rotation speed $\omega$ based on the speed/command value table 70 and controlling the electric motor 18 based on the acquired armature current command value $I_a^*$ and the acquired current phase angle command value $\beta^*$ is referred to as "torque/speed control."

Figure 9:
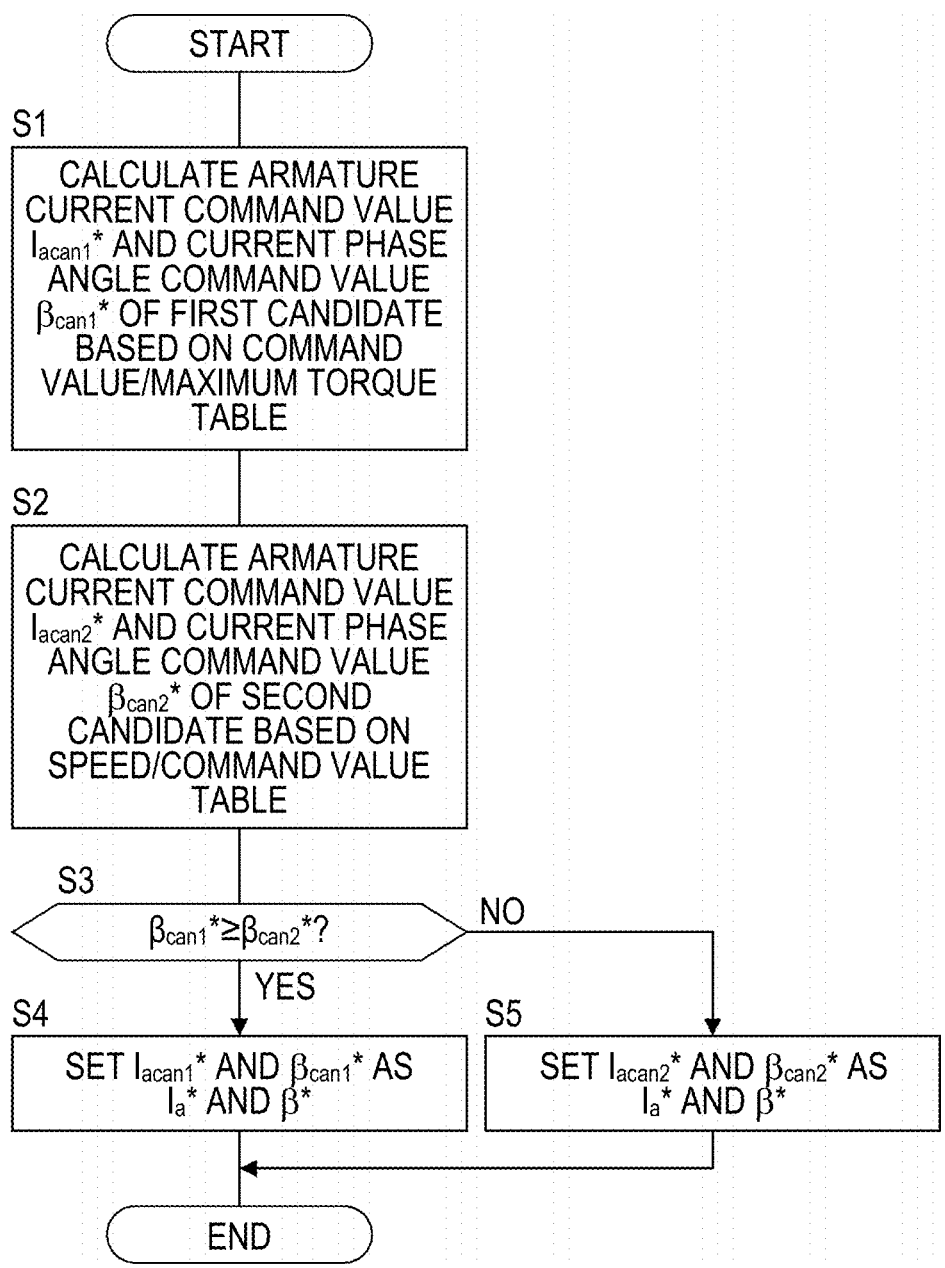
FIG. 9 is a flowchart illustrating operations which are performed by a current command value setting unit.

The operation of the current command value setting unit 42 will be described below in detail. FIG. 9 is a flowchart illustrating a routine of operations which are performed by the current command value setting unit 42. The routine illustrated in FIG. 9 is repeatedly performed at intervals of a predetermined operation cycle. In the following description, a newest rotation speed ω calculated by the rotation speed calculating unit 54 is referred to as an "actual rotation speed ω." The current command value setting unit 42 calculates an armature current command value $I_{acan1}^*$ and a current phase angle command value $\beta_{can1*}$ of a first candidate based on the command value/maximum torque table 60 (Step S1).

Specifically, first, the current command value setting unit 42 selects the table 61 or 62 of the rotation direction corresponding to the sign of the torque command value $T_s^*$ out of the forward-rotation table 61 and the reverse-rotation table 62. Then, the current command value setting unit 42 acquires the armature current command value $I_a^*$ and the current phase angle command value $-\beta^*$ corresponding to the torque command value $T_s^*$ based on the selected table 61 or 62, and stores the acquired command values as an armature current command value $I_{acan1}^*$ and a current phase angle command value $\beta_{can1}^*$ of a first candidate in the memory.

More specifically, the current command value setting unit 42 searches for a motor torque $T_s$ having the same magnitude as the torque command value $T_s^*$ out of a plurality of motor torques $T_s$ in the selected table 61 or 62. When the motor torque $T_s$ having the same magnitude as the torque command value $T_s^*$ can be searched for, the current command value setting unit 42 reads the armature current command value $I_a^*$ and the current phase angle command value $\beta^*$ corresponding to the motor torque $T_s$ from the table 61 or 62 and stores the read command values as the armature current command value $I_{acan1}^*$ and the current phase angle command value $\beta_{can1}^*$ of the first candidate in the memory.

On the other hand, when the motor torque $T_s$ having the same magnitude as the torque command value $T_s^*$ cannot be searched for, the current command value setting unit 42 performs the following process. The current command value setting unit 42 reads an armature current command value $I_a^*$ and a current phase angle command value $\beta^*$ corresponding to a motor torque $T_s$ (hereinafter referred to as a "first motor torque $T_{sL}$") which is less than the torque command value $T_s^*$ and which is closest to the torque command value $T_s^*$ out of a plurality of motor torques Ts in the selected table 61 or 62.

The current command value setting unit 42 reads an armature current command value $I_a^*$ and a current phase angle command value $\beta^*$ corresponding to a motor torque $T_s$ (hereinafter referred to as a "second motor torque $T_{sH}$") which is greater than the torque command value $T_s^*$ and which is closest to the torque command value $T_s^*$ out of a plurality of motor torques $T_s$ in the selected table 61 or 62. Then, the current command value setting unit 42 calculates an armature current command value $I_a^*$ and a current phase angle command value $\beta^*$ corresponding to the torque command value $T_s^*$ by linearly interpolating the armature current command values $I_a^*$ and the current phase angle command value $\beta^*$ of the read two groups.

Specifically, the armature current command value $I_a^*$ and the current phase angle command value $\beta^*$ corresponding to the first motor torques $T_{sL}$ are set as $I_{aL}^*$ and $\beta_L^*$ and the armature current command value $I_a^*$ and the current phase angle command value $\beta^*$ corresponding to the second motor torque $T_{sH}$ are set as $I_{aH}^*$ and $\beta_H^*$. $T_{sH}-T_{sL}=\Delta T_s$, $I_{aH}^*-I_{aL}^*=\Delta I_a^*$, and $\beta_H^*2-\beta_L^*=\Delta\beta^*$ are set.

The current command value setting unit 42 calculates an armature current command value $I_a^*$ and a current phase angle command value $\beta^*$ corresponding to the torque command value $T_s^*$ based on Expressions (5) an (6) and stores the calculated command values as the armature current command value $I_{acan1}^*$ and the current phase angle command value $\beta_{can1}^*$ of the first candidate in the memory.

$$I_a^* = (\Delta I_a^*/T_s) \cdot (T_s^* - T_{sL}) + I_{aL}^* \tag{5}$$

$$\beta^* = (\Delta\beta^*/T_s) \cdot (T_s^* - T_{sL}) + \beta_L^* \tag{6}$$

Then, the current command value setting unit 42 acquires the armature current command value $I_{acan2}^*$ and the current phase angle command value $\beta_{can2}^*$ of the second candidate based on the speed/command value table 70 (Step S2).

Specifically, the current command value setting unit 42 acquires Speed Number n which is closest to an actual rotation speed co as a first speed number n1 from the torque command value table 71. Then, the current command value setting unit 42 searches for a motor torque $T_s$ having the same magnitude as the torque command value $T_s^*$ out of a plurality of motor torques $T_s$ corresponding to the first speed number n1 in the torque command value table 71. When the motor torque $T_s$ having the same magnitude as the torque command value $T_s^*$ can be searched for, the current command value setting unit 42 acquires the torque number m of the motor torque Ts as a first torque number m1.

Then, the current command value setting unit 42 reads an armature current command value $I_a^*$ and a current phase angle command value $\beta^*$ corresponding to the first speed number n1 and the first torque number m1 from the current command value table 72 and the current phase angle command value table 73 and stores the read command values as the armature current command value $I_{acan2}^*$ and the current phase angle command value $\beta_{can2}^*$ of the second candidate in the memory. On the other hand, when the motor torque $T_s$ having the same magnitude as the torque command value $T_s^*$ cannot be searched for, the current command value setting unit 42 performs the following process. The current command value setting unit 42 acquires a torque number m corresponding to the motor torque $T_s$ (hereinafter referred to as a "first motor torque $T_{sL}$") which is less than the torque command value $T_s^*$ and which is closest to the torque command value $T_s^*$ out of a plurality of motor torque $T_s$ corresponding to the first speed number n1 in the torque command value table 71 as the first torque number m1. Then, the current command value setting unit 42 reads an armature current command value $I_a^*$ and a current phase angle command value $\beta^*$ corresponding to the first speed number n1 and the first torque number m1 from the current command value table 72 and the current phase angle command value table 73 and stores the read command values as the armature current command value $I_a^*$ and the current phase angle command value $\beta^*$ corresponding to the first motor torque $T_{sL}$ in the memory.

The current command value setting unit 42 acquires a torque number m corresponding to a motor torque $T_s$ (hereinafter referred to as a "second motor torque $T_{sH}$") which is greater than the torque command value $T_s^*$ and which is closest to the torque command value $T_s^*$ out of a plurality of motor torques Ts corresponding to the first speed number n1 in the torque command value table 71 as a second torque number m2. Then, the current command value setting unit 42 reads an armature current command value $I_a^*$ and a current phase angle command value $\beta^*$ corresponding to the first speed number n1 and the second torque number m2 from the current command value table 72 and the current phase angle command value table 73 and stores the read command values as the armature current command value $I_a^*$ and the current phase angle command value $\beta^*$ corresponding to the second motor torque $T_{sH}$ in the memory.

Then, the current command value setting unit 42 calculates an armature current command value $I_a^*$ and a current phase angle command value $\beta^*$ corresponding to the torque command value $T_s^*$ and the actual rotation speed $\omega$ by interpolating the armature current command values $I_a^*$ and the current phase angle command values $\beta^*$ of the read two groups. Specifically, the armature current command value $I_a^*$ and the current phase angle command value $\beta^*$ corresponding to the first motor torque $T_{sL}$ are set as $I_{aL}^*$ and $\beta_L^*$, and the armature current command value $I_a^*$ and the current phase angle command value $\beta^*$ corresponding to the second motor torque $T_{sH}$ are set as $I_{aH}^*$ and $\beta_H^*$. $T_{sH}-T_{sL}=\Delta T_s$, $I_{aH}^*-I_{aL}^*=\Delta I_a^*$, and $\beta_H^*-\beta_L^*=\Delta\beta^*$ are set.

The current command value setting unit 42 calculates the armature current command value $I_a^*$ and the current phase angle command value $\beta^*$ corresponding to the torque command value $T_s^*$ and the actual rotation speed $\omega$ based on Expressions (5) and (6) and stores the read command values as the armature current command value $i_{acan2}^*$ and the current phase angle command value $\beta_{can2}^*$ of the second candidate in the memory. Then, the current command value setting unit 42 determines whether the current phase angle command value $\beta_{can1}^*$ of the first candidate is equal to or greater than the current phase angle command value $\beta_{can2}^*$ of the second candidate (Step S3). When $\beta_{can1}^* \geq \beta_{can2}^*$ is satisfied (Step S3: YES), the current command value setting unit 42 sets the armature current command value $I_{acan1}^*$ and the current phase angle command value $\beta_{can}^*$ of the first candidate as the armature current command value $I_a^*$ and the current phase angle command value $\beta^*$ (Step S4). Accordingly, maximum torque/current control is performed. Then, the routine in this operation cycle ends.

When it is determined in Step S3 that $\beta_{can1}^* < \beta_{can2}^*$ is satisfied (Step S3: NO), the current command value setting unit 42 sets the armature current command value $I_{acan2}^*$ and the current phase angle command value $\beta_{can2}^*$ of the second candidate as the armature current command value $I_a^*$ and the current phase angle command value $\beta^*$ (Step S5). Accordingly, torque/speed control is performed. Then, the routine in this operation cycle ends.

The reason why the first candidate is selected when $\beta_{can1}^* \geq \beta_{can2}^*$ is satisfied and the second candidate is selected when $\beta_{can1}^* \leq \beta_{can2}^*$ is satisfied will be described below. Curves B1 to B8 in FIG. 8 represent loci of the armature current vector in torque/speed control. Curves B1 to B8 are loci of the armature current vector for each rotation speed when a maximum value is given as the armature current command value $I_a^*$. Accordingly, Curves B1 to B8 constitute a part of a voltage limiting oval. The voltage limiting oval indicates a controllable range of an armature current vector at an arbitrary input voltage (a motor inter-terminal voltage) and an arbitrary rotation speed using a locus of the armature current vector. The voltage limiting oval decreases as the rotation speed of the electric motor 18 increases.

Curve A in FIG. 8 indicates a locus of the armature current vector in maximum torque/current control and a locus of the armature current vector at which the armature current is minimized to output an arbitrary torque from the electric motor 18. When it is intended to output an arbitrary torque from the electric motor 18 and an operating point of torque/speed control is located above Curve A or on the right side with respect to Curve A, the operating point of maximum torque/current control is a most efficient point for outputting the torque. For example, when the actual rotation speed is 1600 [rpm] and the operating point of torque/speed control is located above a crossing point of Curve A and Curve B1 or on the right side with respect to the crossing point, the operating point of maximum torque/current control is a most efficient point for outputting the torque. Accordingly, in this case, it is preferable to control the electric motor through maximum torque/current control. Therefore, when $\beta_{can1}^* \geq \beta_{can2}^*$ is satisfied, the first candidate is set as the armature current command value $I_a^*$ and the current phase angle command value $\beta^*$.

On the other hand, when the operating point of torque/speed control is located on the left side with respect to Curve A, a target torque cannot be output in the maximum torque/current control. For example, when the actual rotation speed is 1600 [rpm] and the operating point of the torque/current control is located on the left side with respect to a crossing point of Curve A and Curve B1, a target torque cannot be output in the maximum torque/current control. Accordingly, in this case, it is preferable to control the electric motor 18 using torque/speed control. Therefore, when $\beta_{can1}^* < \beta_{can2}^*$ is satisfied, the second candidate is set as the armature current command value $I_a^*$ and the current phase angle command value $\beta^*$.

That is, in the first embodiment, the armature current command value $I_a^*$ and the current phase angle command value $\beta^*$ are set such that a current vector set by the armature current command value $I_a^*$ and the current phase angle command value $\beta^*$ is included in an area surrounded by the current vector locus (Curve A) in the maximum torque/current control and the q axis in the d-q coordinate system in FIG. 8. Accordingly, it is possible to output a maximum torque and to output a motor torque corresponding to a motor torque command value in all rotation speed areas.

[2] Second Embodiment

In the first embodiment, the speed/command value table 70 is prepared based on the assumption that the motor inter-terminal voltage is a predetermined reference voltage. When the motor inter-terminal voltage decreases, the voltage limiting oval is reduced. Accordingly, since characteristics indicated by Curves B1 to B8 in FIG. 8 change, details of the speed/command value table 70 in the first embodiment are not suitable for characteristics when the motor inter-terminal voltage decreases.

Accordingly, when the motor inter-terminal voltage decreases, there is a problem in that an area in which a motor torque cannot be output is generated even when a torque command value is in a range in which the motor torque can be output in the torque/speed control according to the first embodiment. The reason is that a command value corresponding to a motor torque which cannot be output as an armature current command value $I_a^*$ and a current phase angle command value $\beta^*$ is set when the motor inter-terminal voltage decreases in the speed/command value table 70 according to the first embodiment and thus an unexpected armature current flows in the electric motor 18.

An objective of the second embodiment is to realize motor control that can output a maximum torque, perform torque control in all rotation speed areas, and solve the aforementioned problem in the first embodiment. In the second embodiment, the method of preparing the speed/ command value table 70 is different from that in the first embodiment. That is, the methods of preparing the torque command value table 71, the current command value table 72, and the current phase angle command value table 73 are different from those in the first embodiment. The second embodiment is different from the first embodiment in the operation of the current command value setting unit 42. The other points are the same as in the first embodiment.

Figure 10:
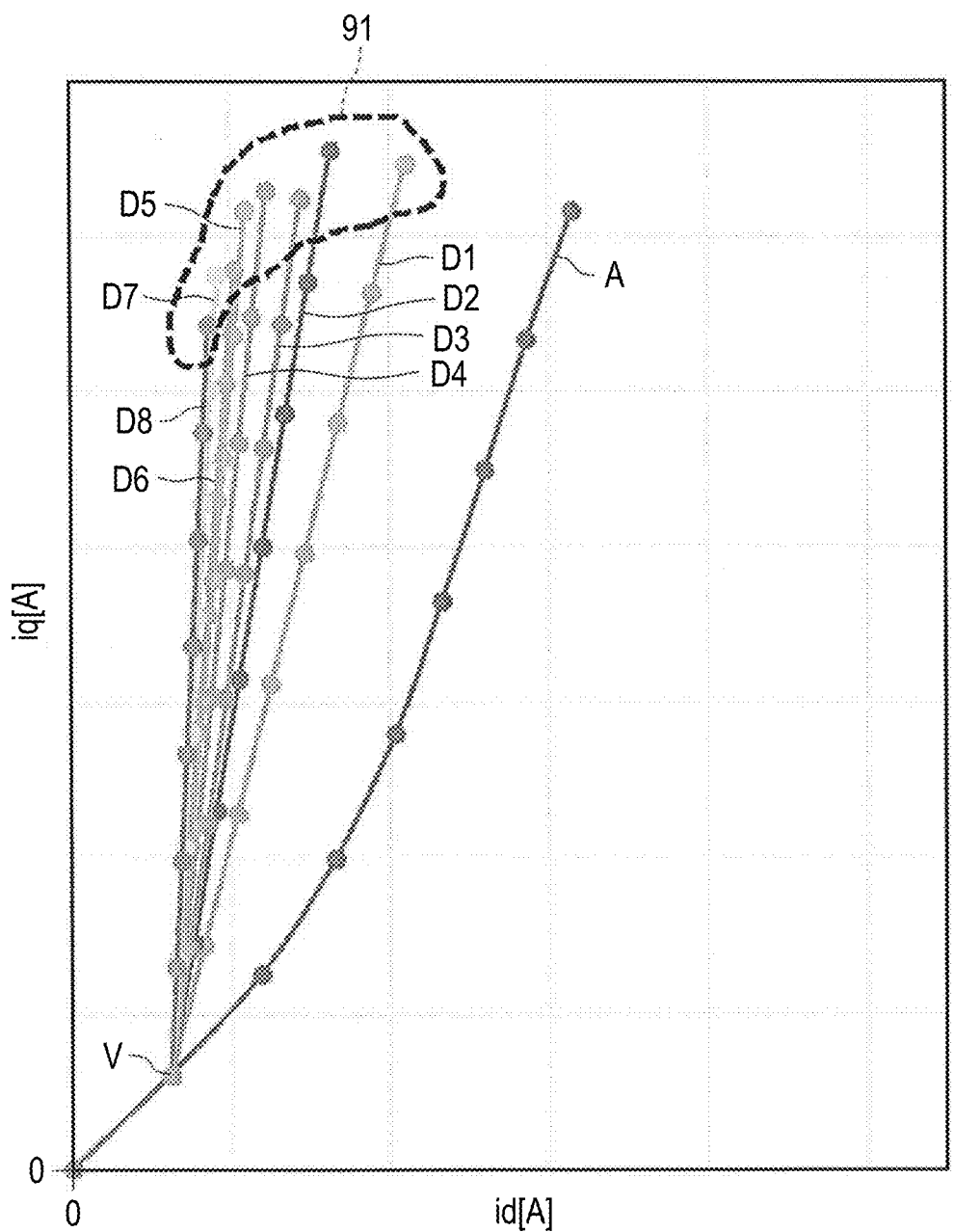
FIG. 10 is a graph illustrating a method of preparing a torque command value table, a current command value table, and a current phase angle command value table according to a second embodiment.

The method of preparing the speed/command value table 70 will be first described below with reference to FIG. 10. FIG. 10 illustrates a d-q coordinate system with a d-axis current on the horizontal axis and with a q-axis current on the vertical axis. First, as illustrated in FIG. 10, Curve A representing a locus of an armature current vector in maximum torque/current control is drawn in the d-q coordinate system. Curve A can be drawn using the same method as in the first embodiment.

Then, an operating point (hereinafter referred to as "maximum output point") at which the motor torque is maximized is calculated at each of 8 types of rotation speeds which are different from each other by a predetermined value (200 rpm in this example) within a predetermined range of the rotation speed (a range from 1600 rpm to 3000 rpm in this example), and the calculated operating points are plotted on the d-q coordinate system. The operating points which are plotted into a closed dotted curve 91 in FIG. 10 are maximum operating points at the corresponding rotation speeds and correspond to the operating points which are plotted into the closed dotted curve 81 in FIG. 8. These operating points can be calculated using the same method as the method of preparing Curves B1 to B8 which has been described above in the first embodiment.

Then, an origin of the d-q coordinate system or a predetermined point close to the origin is set as a convergent point V. In this embodiment, a predetermined point on Curve A which is close to the origin of the d-q coordinate system is set as the convergent point V. The maximum output point at each rotation speed and the convergent point V are connected by a straight line. Accordingly, Straight Lines D1 to D8 are acquired at the 8 types of rotation speeds. Straight Line D1 is a straight line corresponding to 1600 rpm, Straight Line D8 is a straight line corresponding to 3000 rpm, and the rotation angle (the current phase angle β) from the d axis increases as the rotation speed increases.

Then, M operating points including the maximum output point are set on the corresponding straight line for each of Straight Lines D1 to D8. In this embodiment, M operating points are set on each of Straight Lines D1 to D8 such that neighboring two operating points are distant at the same length. The M operating points are a plurality of operating points (third operating points) including the maximum output point (a first operating point) and a plurality of operating points (second operating points) which is set in a direction in which the operating point moves from the maximum output point when the inter-terminal voltage of the electric motor 18 decreases.

Then, a d-axis current $i_d$, a q-axis current $i_q$, an armature current $I_a$, and a current phase angle β corresponding to each of the set operating points are calculated. The armature current $I_a$ at a certain operating point is calculated from the d-axis current $i_d$ and the q-axis current $i_q$ at the operating point. Then, for each operating point, the armature current $I_a$ and the current phase angle β are given as an armature current command value $I_a^*$ and a current phase angle command value β* to the current vector calculating unit 43 of the motor control circuit illustrated in FIG. 3 and a motor torque $T_s$ is measured. In this way, the motor torque $T_s$, the armature current command value $I_a^*$, and the current phase angle command value β* at the M operating points can be acquired for each of Straight Lines D1 to D8.

For example, when 1600 rpm is defined as Speed Number 1, the motor torques $T_s$ at the M operating points on Straight Line D1 are stored as motor torques $T_{s11}$ to $T_{s1M}$ in a row corresponding to Speed Number 1 in the torque command value table 71 (see FIG. 7A), for example, in the ascending order of the armature current command values $I_a^*$. The armature currents $I_a$ at the M operating points on Straight Line D1 are stored as armature current command values $I_{a11}^*$ to $I_{a1M}^*$ in a row corresponding to Speed Number 1 in the current command value table 72 (see FIG. 7B), for example, in the ascending order of the armature current command values $I_a^*$. The current phase angle command values β* at the M operating points on Straight Line D1 are stored as current phase angle command values $β_{11}^*$ to $β_{1M}^*$ in a row corresponding to Speed Number 1 in the current phase angle command value table 73, for example, in the ascending order of the armature current command values $I_a^*$.

M motor torques $T_{n1}$ to $T_{nM}$, M armature current command values $I_{an1}^*$ to $I_{anM}^*$, and M current phase angle command values $β_{n1}^*$ to $β_{nM}^*$ for each of other Speed Numbers 2 to N are calculated in the same way and are stored in the torque command value table 71, the current command value table 72, and the current phase angle command value table 73. The speed/command value table 70 according to the second embodiment is an example of a "third table" in the claims.

Figure 11:
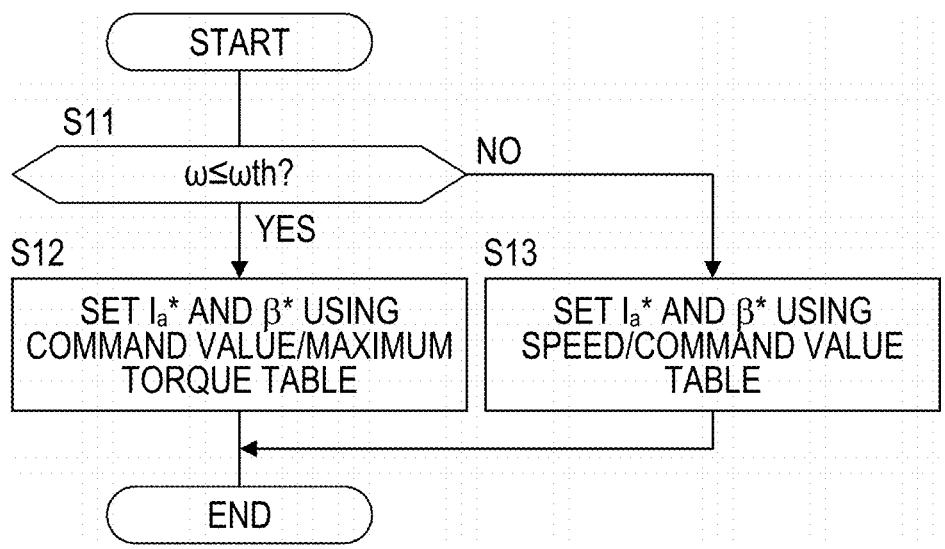
FIG. 11 is a flowchart illustrating operations which are performed by a current command value setting unit according to the second embodiment.

The operation of the current command value setting unit 42 will be described below in detail. FIG. 11 is a flowchart illustrating a routine of operations which are performed by the current command value setting unit 42. The routine illustrated in FIG. 11 is repeatedly performed at intervals of a predetermined operation cycle. The current command value setting unit 42 determines whether an actual rotation speed co is equal to or lower than a predetermined rotation speed $ω_{th}$ (Step S11). The predetermined rotation speed $ω_{th}$ is set to a rotation speed in the vicinity of a boundary point between a predetermined low rotation speed area and a predetermined high rotation speed area. The predetermined low rotation speed area may be a constant torque area in which a torque is almost constant in speed-torque characteristics of the electric motor 18. In this case, the predetermined high rotation speed area is a constant output area in which the rotation speed is higher than that in the constant torque area.

When the actual rotation speed ω is equal to or lower than the predetermined rotation speed $ω_{th}$ (Step S11: YES), the current command value setting unit 42A sets the armature current command value $I_a^*$ and the current phase angle command value β* corresponding to the torque command value $T_s^*$ using the command value/maximum torque table 60 (Step S12: YES). The method of calculating the armature current command value $I_a^*$ and the current phase angle command value β* using the command value/maximum torque table 60 is the same as described in the first embodiment. Then, the routine in this operation cycle ends.

When it is determined in Step S11 that the actual rotation speed ω is higher than the predetermined rotation speed $ω_{th}$ (Step S11: NO), the current command value setting unit 42 sets the armature current command value $I_a^*$ and the current phase angle command value β* corresponding to the torque command value $T_s^*$ and the actual rotation speed ω using the speed/command value table 70 (Step S13: YES). The method of calculating the armature current command value $I_a^*$ and the current phase angle command value $\beta^*$ using the speed/command value table 70 is the same as described in the first embodiment. Then, the routine in this operation cycle ends.

In the second embodiment, the armature current command value $I_a^*$ and the current phase angle command value $\beta^*$ are set such that a current vector set by the d-axis current command value $i_d^*$ and the q-axis current command value $i_q^*$ is included in an area surrounded by the current vector locus in the maximum torque/current control and the q axis in the d-q coordinate system. Accordingly, it is possible to output a maximum torque and to output a motor torque corresponding to a motor torque command value in all rotation speed areas.

In the second embodiment, a plurality of operating points is set in the direction in which the operating point moves due to the decrease in motor inter-terminal voltage, and an armature current, a current phase angle, and a motor torque corresponding to each operating point are set as table values of the speed/command value table 70. Accordingly, even when the motor inter-terminal voltage decreases, a motor torque can be output when a torque command value is in a range in which the motor torque can be output.

That is, in the second embodiment, when the motor inter-terminal voltage decreases and a torque command value is in a range in which a motor torque can be output, the motor torque corresponding to the torque command value can be output. In other words, in the second embodiment, even when the motor inter-terminal voltage decreases, an area in which a motor torque corresponding to a torque command value can be output is wider than that in the first embodiment. Accordingly, it is possible to solve the problem in the first embodiment.

While the first and second embodiments of the disclosure have been described above, the disclosure may be embodied in other forms. In the first and second embodiments, the microcomputer 31 includes the voltage limiting unit 48, but it may not include the voltage limiting unit 48. In the first and second embodiments, a synchronous reluctance motor that can rotate in two directions including the forward rotation direction and the reverse rotation direction has been exemplified, but the disclosure can also apply to an electric synchronous reluctance motor that is rotationally driven in only one direction.

In the first and second embodiments, the electric motor 18 is a synchronous reluctance motor, but the electric motor 18 may be a motor (such as a switched reluctance motor or an IPM motor) other than the synchronous reluctance motor as long it is a motor in which a rotor is rotated using a reluctance torque. In the first and second embodiments, the disclosure has applied to a control device of an electric motor for an electric power steering system. However, the disclosure can also apply to a motor control device other than the control device of an electric motor for an electric power steering system as long as it is a control device of a motor which is controlled based on a torque command value.

The disclosure can be subjected to various changes in design without departing from the scope of the disclosure described in the appended claims.

What is claimed is:

1. A motor control device that controls a motor using a reluctance torque, the motor control device comprising:
a first setting unit configured to set a motor torque command value which is a command value of a motor torque which is to be generated from the motor;
a rotation speed detecting unit configured to detect a rotation speed of the motor;
a second setting unit configured to set an armature current command value and a current phase angle command value based on the rotation speed and the motor torque command value;
a current vector setting unit configured to set a d-axis current command value and a q-axis current command value based on the armature current command value and the current phase angle command value; and
a drive unit configured to drive the motor based on the d-axis current command value and the q-axis current command value,
wherein the second setting unit is configured to set the armature current command value and the current phase angle command value such that an armature current vector which is set based on the d-axis current command value and the q-axis current command value is included in an area surrounded by an armature current vector locus in maximum torque/current control and a vertical axis in a d-q coordinate system with a d-axis current on a horizontal axis and with a q-axis current on the vertical axis.

2. The motor control device according to claim 1, further comprising:
a first table in which a motor torque generated from the motor is stored in correlation with a combination of an armature current command value and a current phase angle command value in which the motor torque is maximized at the corresponding armature current command value; and
a second table in which armature current command values, current phase angle command values, and motor torques at a plurality of operating points on a voltage limiting oval are stored in correlation for each rotation speed of the motor,
wherein the second setting unit is configured to calculate an armature current command value and a current phase angle command value of a first candidate based on the motor torque command value and the first table, to calculate an armature current command value and a current phase angle command value of a second candidate based on the rotation speed, the motor torque command value, and the second table, to set the armature current command value and the current phase angle command value of the first candidate as command values when the current phase angle command value of the first candidate is equal to or greater than the current phase angle command value of the second candidate, and to set the armature current command value and the current phase angle command value of the second candidate as command values when the current phase angle command value of the first candidate is less than the current phase angle command value of the second candidate.

3. The motor control device according to claim 2, wherein the plurality of operating points on the voltage limiting oval corresponding to a rotation speed of the motor includes an operating point at which the motor torque is maximized at the rotation speed.

4. The motor control device according to claim 1, further comprising:
a first table in which a motor torque generated from the motor is stored in correlation with a combination of an armature current command value and a current phase angle command value in which the motor torque is maximized at the corresponding armature current command value; and a third table in which armature current command values, current phase angle command values, and motor torques at a plurality of third operating points including a first operating point at which the motor torque is maximized at a corresponding rotation speed and a plurality of second operating points which is set in a direction in which an operating point moves from the first operating point when an inter-terminal voltage of the motor decreases are stored in correlation for each rotation speed of the motor (18), wherein the second setting unit is configured to set the armature current command value and the current phase angle command value based on the motor torque command value and the first table when the rotation speed is equal to or lower than a predetermined value and to set the armature current command value and the current phase angle command value based on the rotation speed, the motor torque command value, and the third table when the rotation speed is higher than the predetermined value.

5. The motor control device according to claim 4, wherein the plurality of third operating points is set on a straight line connecting the first operating point at the corresponding rotation speed and a convergent point which is set as an origin of the d-q coordinate system or a predetermined point close to the origin for each rotation speed in the d-q coordinate system.

* * * * *